United States Patent [19]

Logan

[11] 4,004,336
[45] Jan. 25, 1977

[54] INTERCOMPARTMENT SEAL FOR ROTARY FEEDER

[75] Inventor: Forrest E. Logan, Claremont, Calif.

[73] Assignee: Occidental Petroleum Corporation, Los Angeles, Calif.

[22] Filed: July 28, 1975

[21] Appl. No.: 599,675

Related U.S. Application Data

[62] Division of Ser. No. 388,388, Aug. 15, 1973, Pat. No. 3,913,800.

[52] U.S. Cl. .................. 29/156.4 R; 29/DIG. 26; 29/434; 29/401 F
[51] Int. Cl.² .................. B23P 15/00; B23P 7/00; G01F 11/20
[58] Field of Search .............. 29/156.8 R, 156.4 R, 29/DIG. 26, 434, 401 F, 401 R; 51/290; 222/368; 277/81 R; 415/202; 418/114

[56] References Cited

UNITED STATES PATENTS

| 3,195,412 | 7/1965 | Phillips | 29/156.4 R |
|---|---|---|---|
| 3,201,007 | 8/1965 | Transeau | 222/368 |
| 3,286,335 | 11/1966 | Di Pietra | 29/156.4 R |
| 3,367,544 | 2/1968 | Formando | 222/368 |
| 3,893,816 | 7/1975 | Payne | 29/DIG. 26 |

Primary Examiner—C.W. Lanham
Assistant Examiner—Daniel C. Crane
Attorney, Agent, or Firm—Christie, Parker & Hale

[57] ABSTRACT

In a rotary feeder, a sealing surface on the end of each compartment defining radial wall is closely spaced from the peripheral surface of the rotor cavity in the housing, a distance that establishes controlled laminar fluid flow between compartments. Preferably, the sealing surface has an approximately uniform spacing from the peripheral surface of the cavity and a matching curvature, and is formed on a blade at least as wide as the radial wall.

2 Claims, 3 Drawing Figures

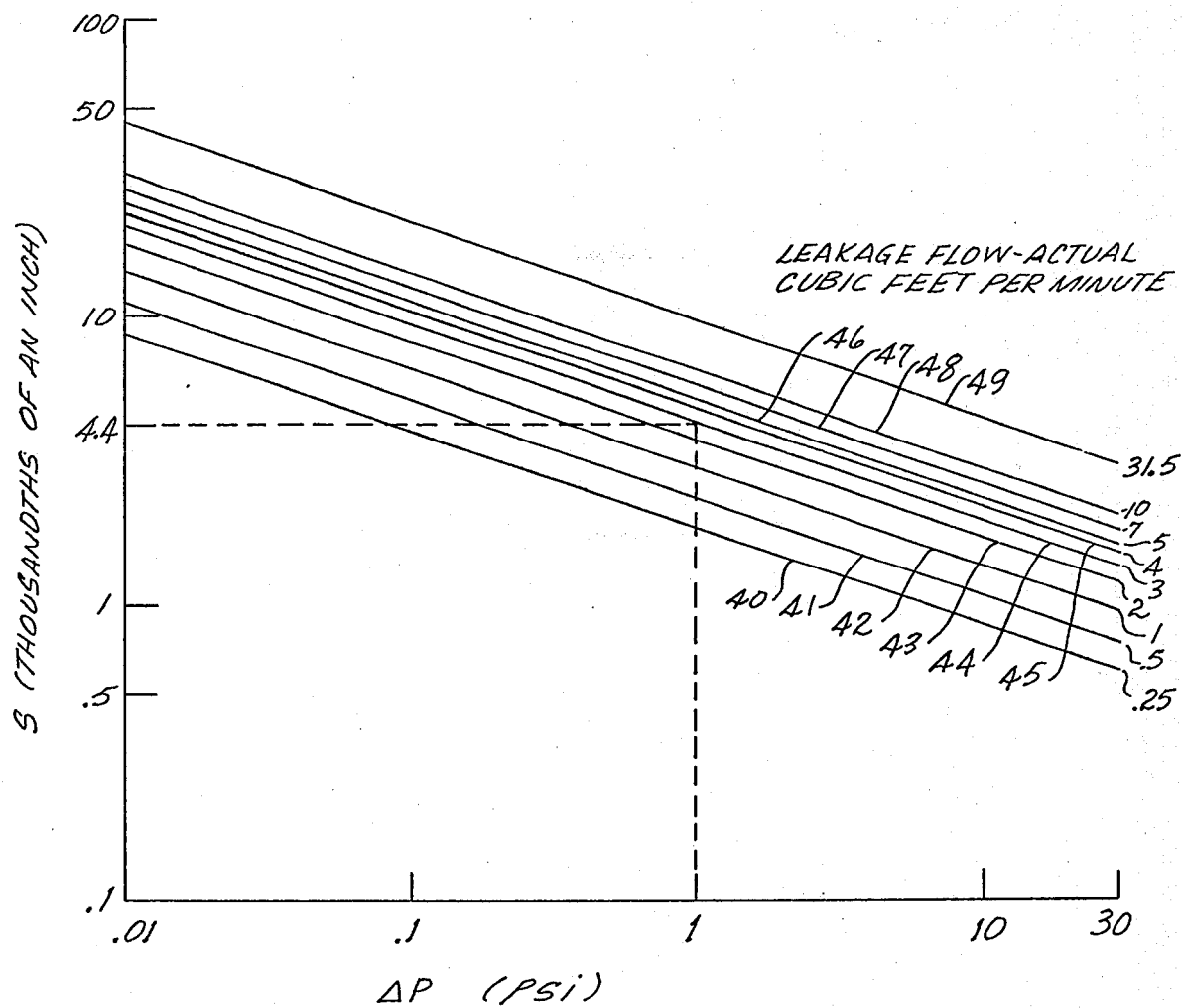

INTERCOMPARTMENT SEAL FOR ROTARY FEEDER

This is a division of application Ser. No. 388,388, filed Aug. 15, 1973, now U.S. Pat. No. 3,913,800.

BACKGROUND OF THE INVENTION

This invention relates to a rotary feeder and, more particularly, to an improved intercompartment seal for such feeder.

Typical rotary feeders are disclosed in U.S. Pat. Nos. 2,879,094; 2,886,191; 3,052,383 and 3,201,007. In general, a rotor having compartment defining radial walls is mounted within a cylindrical rotor cavity of a housing to rotate between an inlet port and an outlet port that communicate with the cavity. There are two aspects to sealing the compartments — sealing the interface between the end of the rotor and the cavity and sealing the compartments from each other. They function to transfer particulate materials in a fluid media such as a gas in segments from the inlet port to the outlet port. Conventionally, the intercompartment seals comprise a blade mounted at the end of each radial wall. One technique employs a blade made of a flexible material, such as rubber, in contact with the peripheral surface of the cavity. The flexibility of the material ensures that the blade will remain in contact with the peripheral surface of the cavity despite surface irregularities and axial misalignment of the rotor within the cavity. Materials from which flexible blades are made tend to deteriorate when exposed to extremely high or low temperatures, and to abrasive particulate material. Another technique employs a soft metallic blade that has a chamfered surface in contact with the peripheral surface of the cavity. Metallic blades tend to wear down in use, particularly when the feeder handles abrasive particulate material. Thus, such metallic blades must be frequently readjusted and replaced to maintain contact as they wear in the course of operation.

In a pyrolytic process, a typical application of a rotary feeder is to couple particulate solids separated from a gaseous carrier stream by a cyclone to another gas stream at a higher pressure. If the intercompartment seals do not function effectively, too much gas will flow through the feeder in the reverse direction. This is known as "blow-by". This reverse flow carries with it the separated particles, thereby reducing the efficiency of the transfer operation. Furthermore, the reverse flowing gas mixes with the gas in the cyclone, which is highly objectionable in a process where isolation is a requirement.

SUMMARY OF THE INVENTION

According to the invention, on the end of each compartment defining radial wall of a rotary feeder there is provided a sealing surface closely spaced from the peripheral surface of the rotor cavity, a distance that establishes controlled laminar fluid flow between the compartments. Preferably, the sealing surface has an approximately uniform spacing from the peripheral surface of the cavity and a matching curvature, and the sealing surface is formed on a blade at least as wide as the radial wall. The spacing between the sealing surface and the peripheral surface of the cavity is selected to provide an acceptable leakage flow rate between compartments for the particular pressure differential between the inlet and outlet of the rotary valve and the fluid characteristics. Such acceptable leakage flow in a pyrolytic process, wherein the rotary feeder is coupled to the solids discharge of a cyclone, is about 0.5% of the total gas flow to the cyclone.

Since the intercompartment seal does not rely on the flexibility of the blade, any material that will resist the environment in the rotary feeder can be used to form the seal with a peripheral surface of the rotor cavity. Since the intercompartment seal does not rely on contact between the blade and the peripheral surface of the cavity, the blade wear is negligible. Nevertheless, there results an effective fluid seal through which the leakage can be controlled to meet required specifications by reducing the space between the sealing surface on the end of each compartment defining radial wall and the peripheral surface of the cavity and/or increasing the width of the sealing surface so that an upset condition in the feed system to the rotary valve will not occur.

BRIEF DESCRIPTION OF THE DRAWINGS

The features of a specific embodiment of the best mode contemplated of carrying out the invention are illustrated in the drawings, in which:

FIG. 3 is a graph of spacing of an intercompartment seal of FIGS. 1 and 2 as a function of differential pressure for a number of different values of leakage flow.

DETAILED DESCRIPTION OF THE SPECIFIC EMBODIMENT

Figure 1:
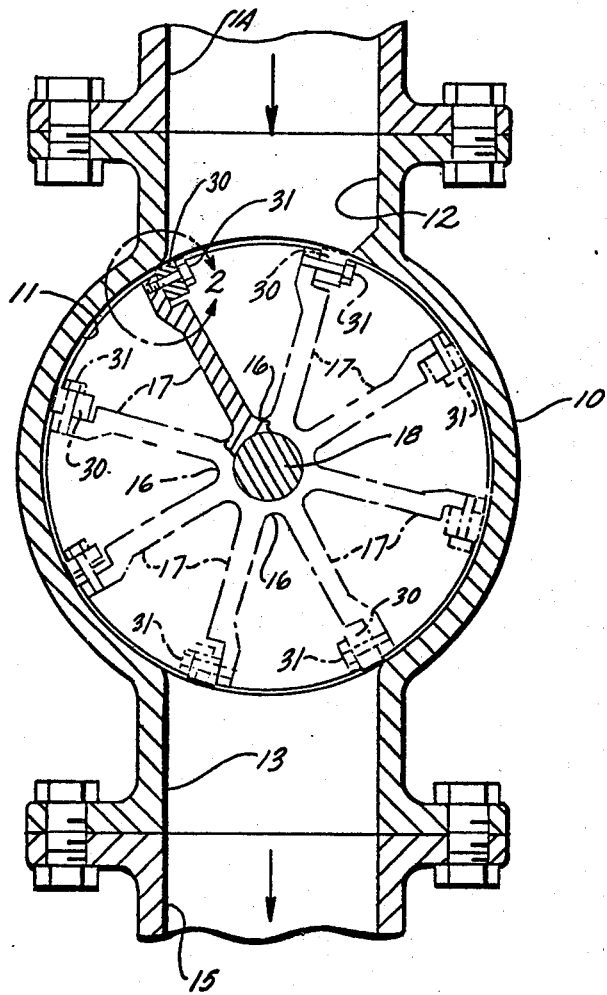
FIG. 1 is a side sectional view of a rotary feeder incorporating the principles of the invention.

In the rotary feeder of FIG. 1, a housing 10 has a cylindrical rotor cavity 11. An inlet port 12 and an outlet port 13 communicate with cavity 11. A gas in which a particulate material such as char may be suspended, is coupled by a conduit 14 to inlet port 12. By way of example, conduit 14 could be connected to a cyclone where the char is separated. Outlet port 13 is coupled to a conduit 15 that carries away the particulate material passing through the rotary feeder. By way of example, conduit 15 could be connected to discharge into another gas stream, which is at a higher pressure than conduit 14.

A rotor 16, which has a plurality of compartment defining radial walls 17, is fixedly mounted on a shaft 18. Shaft 18 is coupled to a motor (not shown) to rotationally drive rotor 16. The ends of rotor 16 are sealed by conventional means not related to the invention. The compartments of rotor 16 are sealed by sealing blades 30 mounted at the ends of respective walls 17. Sealing blades 30 are adjustably attached to the respective ends of walls 17 by fasteners 31.

Figure 2:
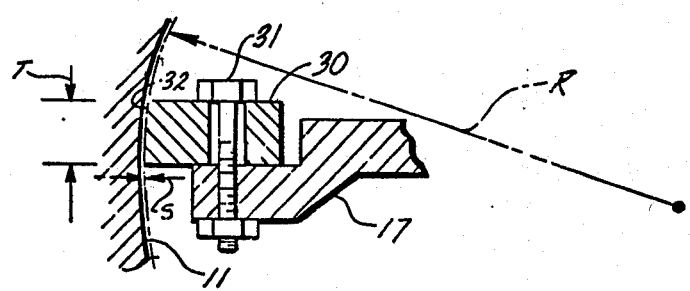
FIG. 2 is an enlargement of one of the intercompartment seals shown in FIG. 1.

Reference is made to FIG. 2 for an enlarged view of one of sealing blades 30. Adjacent to the periphery of cavity 11, blade 30 has a sealing surface 32. Surface 32 is a longitudinal segment of a right cylinder having a radius R equal to the radius of cavity 11. Accordingly, the curvature of surface 32 substantially matches the curvature of the peripheral surface of cavity 11. Surface 32 is closely spaced a distance S from the peripheral surface of cavity 11 to form a narrow uniform gap at the end of wall 17. The width T of surface 32 is preferably at least as large as that of wall 17. The spacing S is sufficiently small and the width T is sufficiently large to establish controlled laminar flow of the gas in the feeder through the narrow gap between blade 30 and the adjacent peripheral surface of cavity 11. As a result, the leakage flow rate is quite small, normally in order of about 0.5% of total gas flow to the coupled cyclone (not shown), and less than that which will disrupt the feed system.

Proper blade clearance or spacing S can be calculated by the following formula:

$$S_t = f \pm 0.25f \quad (1)$$

wherein $$f = \left[ \frac{1.25 \times 10^4 (N-2)(T)}{L} \cdot (\mu_t) \cdot \frac{Q}{\Delta P} \right]^{1/3} \quad (2)$$

wherein
S = The blade clearance.
Q = The total predetermined actual leakage or blow-by over the blade sealing surfaces in actual cubic feet per minute.
ΔP = The pressure differential across the rotary feeder in pounds per square inch.
T = The flow resistance as represented by the width of a sealing surface in inches.
L = Length of a sealing surface blade in inches.
N = The number of sealing surface blades on the rotor, the minimum of which is four.
u = The viscosity of the gas flowing over the blade tip sealing surface in centipoises.
t = Is the gas temperature in ° F.

Based on these considerations, there is shown in FIG. 3, the log-log relationship of leakage of spacing S and pressure differential ΔP for nitrogen gas in specific valve configuration at 1200° F.

The valve configuration is for a 4 inch rotary valve having eight blade tips where each blade is 6.875 inches long (L) and leaving blade tip width (T) of 0.0625 inch.

Since N = 8, T = 0.625 inch, L = 6.875 inches and u = 0.04 cp, f becomes:

$$f = \left( 27.27 \frac{Q}{\Delta P} \right)^{1/3} \quad (3)$$

In the calculations, the leakage around the sides of the rotor blades or through the bearing area are ignored since they occur independent of the seal employed.

Curves 40 through 49 represent different values of leakage flow rate through the gap between sealing surface 32 and the peripheral surface of cavity 11. Curves 40, 41, 42, 43, 44, 45, 46, 47, 48, and 49 represent, respectively, flow rates of 0.25, 0.5, 1.0, 2.0, 3.0, 4.0, 5.0, 7.0, 10.0, and 31.5 actual cubic feet per minute for the eight blade rotor. The spacing S is determined for the particular differential pressure and the allowable leakage flow rate from the graph. Of curves 40 through 49, the one that corresponds to the allowable leakage flow rate is followed along the abscissa to the particular pressure differential involved, and the spacing S at that point on the ordinate is read from the graph. For example, if the allowable leakage flow rate Q is 3.0 CFM and the differential pressure ΔP is 1.0 psi, curve 44 is traversed to 1.0 on the abscissa to the corresponding point on the ordinate, the spacing S is about 4.4 thousandths of an inch. Fastener 31 is then loosened to permit movement of blade 30 to establish this spacing S.

Since thermal expansions of the rotor cavity and rotor will be about the same, the spacing S can be made ambient temperature with reasonable assuring it will not change at elevated temperatures.

Blade 30 is preferably made of a metal that is softer than the metal from which housing 10 is made at the operating temperature of the rotary feeder. However, blade 30 could be made of any material that can withstand the environment within the rotary feeder. For extreme temperatures for which the rotary feeder seal of this invention is particularly suited, the preferred materials are stainless steel Iconel™ and the like.

The invention can be employed to retrofit existing rotary feeders to permit longer life of the intercompartment seals. The blade incorporating the principles of the invention would be constructed in exactly the same manner as the original blade it replaces, except for sealing surface 32. For example, the same method of attaching the sealing blades and compatible blade dimensions would be employed. In preparing sealing surface 32, the rotor is used as a jig. The blades are mounted on the ends of walls 17 so they extend out slightly beyond a radius R, i.e., the radius of cavity 11. The rotor is mounted on a lathe or other appropriate machine tool to cut the sealing surface of the blades to a radius R and to a finish of about 16 to 32 by acceptable machine standards. After the sealing blades are machined, the blade tips are loosened and the rotor is installed in the rotor cavity. Then, the spacing S between the sealing surface and the periphery of the rotor cavity is adjusted by a feeler gauge to the value determined from the graph of FIG. 3 to establish the allowable leakage flow rate for the given gas characteristics and the differential pressure. It is important to ensure that the distance S is uniform across the entire length of the blade; otherwise, the leakage flow would be uneven.

Since spacings will normally be made at ambient temperature, for instance 70° F, adjustments will have to be made for thermal expansion or contraction of the blade material such that it will have the desired spacing from the wall of the cavity at operating temperature.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention.

I claim:
1. In a rotary feeder having a housing that defines a cylindrical cavity with a curved peripheral surface of radius, R, a rotor mounted to rotate within the cavity, at least from compartment defining radial walls on the rotor, and a radially adjustable sealing surface mounted at the end of each radial wall, the method of establishing an intercompartment seal between the end of each radial wall and the peripheral surface of the cavity, the method comprising the following steps in the order recited:
   removing the rotor from the housing cavity;
   rotating the rotor while removed from the housing;
   cutting a sealing surface at the end of each blade to the radius, R, while rotating the rotor to form on the end of each blade a curved sealing surface with a radius of curvature that matches the curvature of the peripheral surface;

adjusting each blade radially inward;

returning the rotor in the housing cavity; and adjusting each blade radially outward so each blade is uniformly and closely spaced from the peripheral surface of the housing cavity by a distance which establishes controlled fluid leakage between the compartments defined by the radial walls and blades.

2. A rotary feeder as claimed in claim 1 in which each blade is radially adjusted outward to a spacing $S_t$ from the peripheral surface to proved controlled leakage wherein $S_t$ is determined by approximate expression:

$$S_t = f \pm 0.25 f$$

wherein $$f = \left[ \frac{1.25 \times 10^4 \ (N-2)(T)}{L} \cdot (\mu_t) \cdot \frac{Q}{\Delta P} \right]^{1/3}$$

and wherein

Q is the total actual leakage over the sealing surface in actual cubic feet per minute; $\Delta P$ is the pressure differential across the rotary feeder in pounds per square inch; T is the flow resistance across as represented by the width of the sealing surface in inches; L is the length of a sealing surface blade in inches; N is the number of sealing surface blades and is at least 4; $\mu$ is the viscosity of the gas flowing the sealing surfaces in centipoises and $t$ is gas temperature in °F.

* * * * *